United States Patent [19]

Tomozawa et al.

[11] Patent Number: 4,745,554

[45] Date of Patent: May 17, 1988

[54] METHOD OF DETECTING THE NUMBER OF REVOLUTIONS OF INTERNAL COMBUSTION ENGINE

[75] Inventors: Kikuo Tomozawa; Hayato Yasui, both of Tokyo; Akihiro Yamato; Yutaka Otobe, both of Shiki, all of Japan

[73] Assignees: Oki Electric Industry Co., Ltd.; Honda Giken Kogyo Kabushiki Kaisha, both of Tokyo, Japan

[21] Appl. No.: 842,760

[22] Filed: Mar. 21, 1986

Related U.S. Application Data

[63] Continuation of Ser. No. 541,204, Oct. 12, 1983, abandoned.

[30] Foreign Application Priority Data

Oct. 12, 1982 [JP] Japan ................................ 57-179360

[51] Int. Cl.[4] .............................................. G05B 15/00
[52] U.S. Cl. ................................ 364/431.07; 364/565; 364/569; 73/119 A
[58] Field of Search ................... 364/431.07, 565, 569; 123/416, 417, 418; 324/160, 164; 73/119 A

[56] References Cited

U.S. PATENT DOCUMENTS

| | | | |
|---|---|---|---|
| 4,197,767 | 4/1980 | Leung | 364/569 |
| 4,395,905 | 8/1983 | Fujimori et al. | 73/119 A |
| 4,434,470 | 2/1984 | Thomas et al. | 364/565 |
| 4,566,069 | 1/1986 | Hirayama et al. | 364/565 |
| 4,578,755 | 3/1986 | Quinn et al. | 364/569 |

FOREIGN PATENT DOCUMENTS 58-144664 8/1983 Japan .

Primary Examiner—Parshotam S. Lall
Attorney, Agent, or Firm—Armstrong, Nikaido, Marmelstein & Kubovcik

[57] ABSTRACT

The present invention relates to a method of detecting the number of revolutions of an internal combustion engine. Utilizing the presence of a certain multiple relationship between the period of a top dead-center signal and the period of a cylinder discrimination signal, the present invention is constructed so that, with respect to clock signals to be counted for detecting the number of revolutions, between the period of a clock signal used when using the top dead-center signal and the period of a clock signal used when using the cylinder discrimination signal there exists a multiple relationship which is the same as the multiple relationship between the period of the top dead-center signal and that of the cylinder discrimination signal.

2 Claims, 2 Drawing Sheets

METHOD OF DETECTING THE NUMBER OF REVOLUTIONS OF INTERNAL COMBUSTION ENGINE

This application is a continuation of application Ser. No. 541,204 filed 10/12/83, now abandoned.

BACKGROUND OF THE INVENTION

1. Field of the Invention

The present invention relates to a method of detecting the number of revolutions of an internal combustion engine. More particularly, it is concerned with a method of detecting the number of revolutions of an internal combustion engine that is capable of detecting such number of revolutions accurately and easily by using a cylinder discrimination signal in the case where a top dead-center signal as a reference signal for detecting such number of revolutions cannot be detected.

2. Description of the Prior Art

Recently, various electronic techniques have been utilized for vehicles such as passenger cars. For example, a microcomputer is utilized to effect various controls, including control of the operation of an internal combustion engine and control of the ignition timing of an ignition device, whereby it is intended to improve the operating efficiency and performance of the internal combustion engine. In order that such an electronic control system can effectively control mechanical devices such as an internal combustion engine, it is necessary that various status quantities associated with the mechanical devices to be controlled be detected accurately and fed to the control system as basic informations for the control.

The number of revolutions of an internal combustion engine is one of the above-mentioned status quantities and usually it is detected on the basis of signals provided from a crank angle sensor. As a method of detecting the number of revolutions of an internal combustion engine on the basis of signals provided from a crank angle sensor, there is known a conventional method which is shown in FIG. 3, and as shown utilizes a top dead-center signal $S_1$ produced when each piston reaches the position of the top dead center, a cylinder discrimination signal $S_2$ produced when a predetermined cylinder reaches the time point of ignition and a separately produced clock signal $S_3$ having a constant period, and in which the number of pulses of the clock signal $S_3$ in one period ($t_1$ or $t_2$) of either the top dead-center signal $S_1$ or the cylinder discrimination signal $S_2$ is counted to detect the number of revolutions of the internal combustion engine. According to this conventional method, a signal processing is usually performed in such a manner that the number of pulses of the clock signal $S_3$ is counted at every period $t_1$ of the top dead-center signal $S_1$, and when it becomes impossible to detect the top dead-center signal $S_1$ by some cause or other, the number of pulses of the clock signal $S_3$ is counted at every period $t_2$ of the cylinder discrimination signal $S_2$.

According to such conventional method of detecting the number of revolutions of an internal combustion engine, however, in the case of counting the number of pulses of the clock signal $S_3$ on the basis of the period $t_2$ of the cylinder discrimination signal $S_2$, the number of counted pulses of the clock signal $S_3$ becomes large because the period $t_2$ is generally an integer multiple of $t_1$ (four times as long as $t_1$ in this embodiment), and particularly in a low revolution region of an internal combustion engine the value of the period $t_2$ becomes so large that the number of counted pulses of the clock signal $S_3$ is further increased, thus causing the counter to overflow.

On the other hand, in the method wherein the number of revolutions of an internal combustion engine is detected by using a program which has been made in advance so as to count the number of pulses of the clock signal $S_3$ at the period of the top dead-center signal $S_1$, in the case of counting the number of pulses of the clock signal $S_3$ at the period of the cylinder discrimination signal $S_2$, the number of counted pulses becomes four times as large as that in the pulse counting at the period of the top dead-center signal $S_1$, thus requiring at every period $t_2$ a processing 1 for reducing the number of counted pulses to one fourth as is shown in FIG. 4, which is not desirable in the algorithm for attaining more rapid operations.

SUMMARY OF THE INVENTION

It is an object of the present invention to provide a method of detecting the number of revolutions of an internal combustion engine which method, when it is impossible to detect a top dead-center signal, uses a cylinder discrimination signal having a longer period in place of the top dead-center signal and which method can reduce the number of steps of an arithmetic processing program for obtaining the number of revolutions, without overflow in the counting of pulses of a clock signal as a basic signal for detecting the number of revolutions, particularly in a low revolution region, and hence can detect the number of revolutions accurately and easily.

The present invention is characterized in that, in the method of detecting the number of revolutions of an internal combustion engine by counting the number of pulses of a clock signal at every period of either a top dead-center signal or a cylinder discrimination signal, the period of the clock signal is made variable and different in predetermined relations respectively to the top dead-center signal and the cylinder discrimination signal so that the clock signals of different periods are equal in frequency to each other respectively relative to one period of the top dead-center signal and that of the cylinder discrimination signal.

DETAILED DESCRIPTION OF A PREFERRED EMBODIMENT

Figure 1:
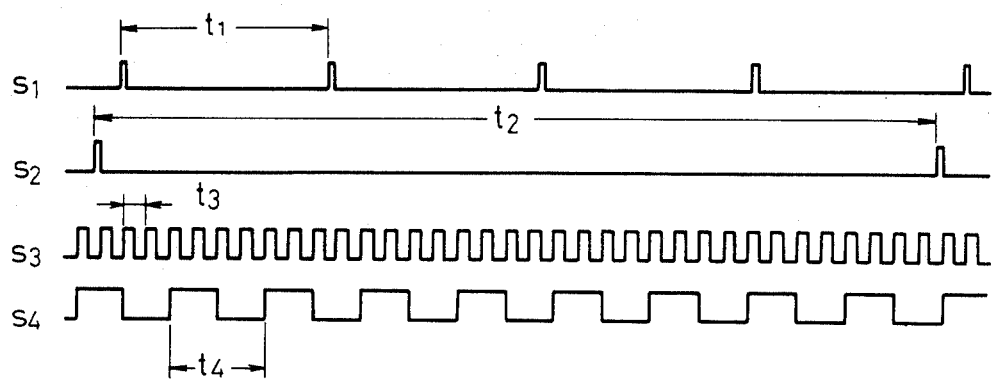
FIG. 1 is a time chart showing signals used in the revolution detecting method of the present invention.
Figure 2:
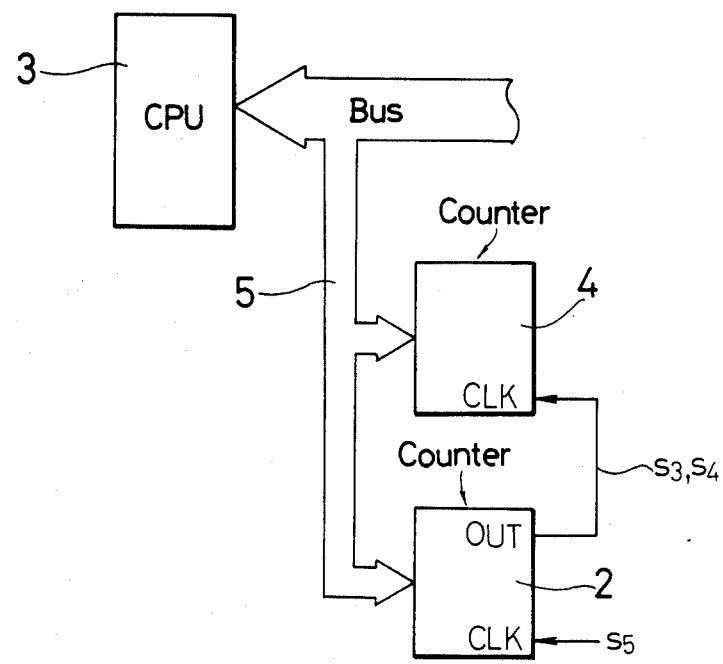
FIG. 2 is a circuit diagram for attaining the method of the present invention.
Figure 3:
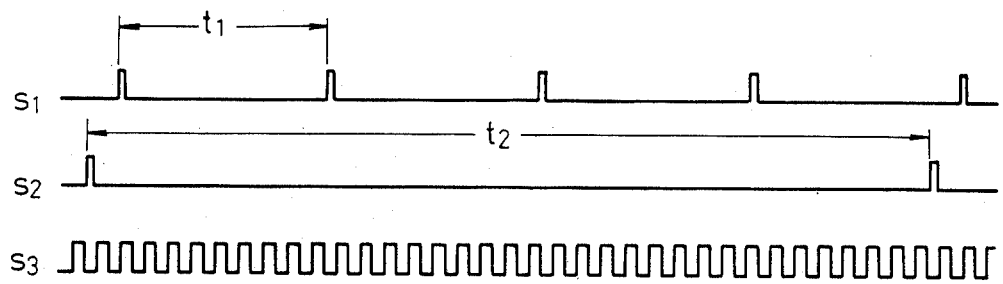
FIG. 3 is a time chart showing signals used in the conventional revolution detecting method.
Figure 4:
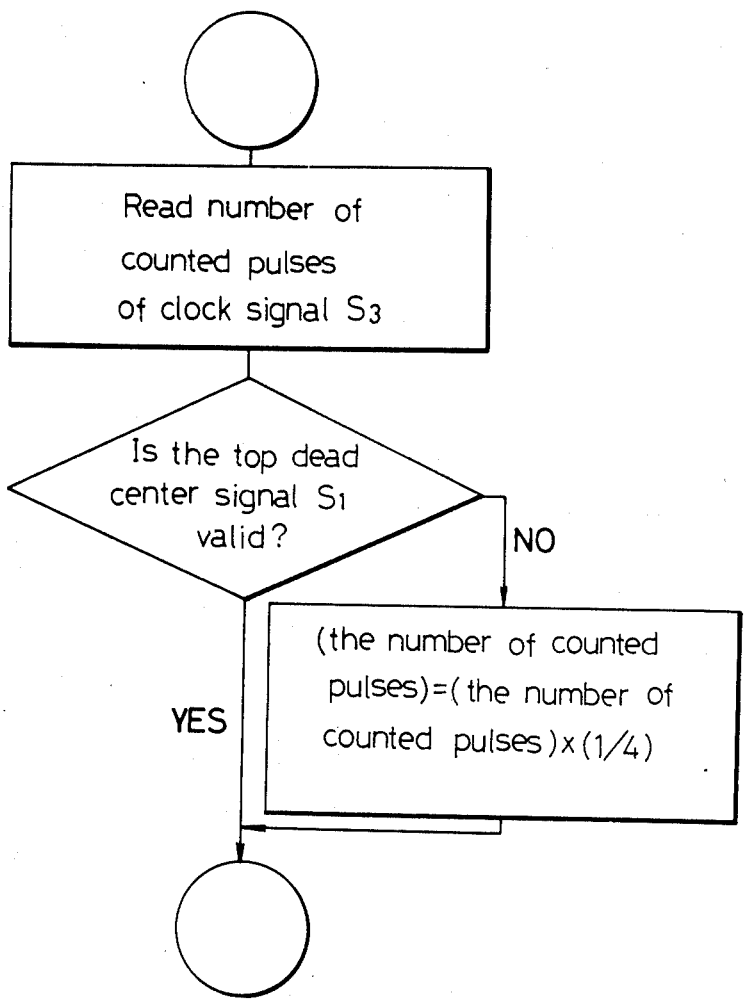
FIG. 4 is a flow chart showing decision and processing required for a conventional revolution detecting method in the case of using a cylinder discrimination signal.

Referring to FIG. 1, signals indicated by the reference marks $S_1$, $S_2$ and $S_3$ are the same as those used in the foregoing conventional method, namely, a top dead-center signal, a cylinder discrimination signal and a clock signal, respectively. The top dead-center signal $S_1$ is produced when the piston of each cylinder of an internal combustion engine is in the position of the top dead center, and the cylinder discrimination signal $S_2$ is a reference signal for cylinder discrimination which decides the correlation between the top dead-center signal and the cylinder. These signals $S_1$ and $S_2$ are produced by means of, for example, a crank angle sensor of an electromagnetic pickup type integral with the distributor. Such signals $S_1$, $S_2$ and the device for generating those signals are already known. The top dead-center signal $S_1$ and the cylinder discrimination signal $S_2$, which are produced as periodic pulses, have periods $t_1$ and $t_2$, respectively. In this embodiment, the periods $t_1$ and $t_2$ are in the relationship of $t_2 = 4\, t_1$. The signals $S_1$ and $S_2$ are fed to a microcomputer mounted in a control unit in such a relation of signal generation as shown in FIG. 1. The clock signal $S_3$ is produced by means of a pulse generator mounted in the control unit. In this embodiment, it is produced by means of a counter 2 which receives and counts a basic clock signal $S_5$, as shown in FIG. 2. In this embodiment, moreover, the period of the clock signal $S_3$ is set at 16 $\mu$sec as an example.

In addition to the top dead-center signal $S_1$, cylinder discrimination signal $S_2$ and clock signal $S_3$ (as a first clock signal), the present invention further utilizes a second clock signal $S_4$, which is counted to detect the number of revolutions in the case of using the cylinder discrimination signal $S_2$. The clock signal $S_4$ has a period $t_4$ which is set at a value four times as long as the period $t_3$ of the clock signal $S_3$. Since the period $t_3$ is set at 16 $\mu$sec, the period $t_4$ becomes equal to 64 $\mu$sec, in this embodiment.

Like the clock signal $S_3$, the clock signal $S_4$ is also produced by means of the counter 2. But the clock signals $S_3$ and $S_4$ are not simultaneously produced. Usually, the first clock signal $S_3$ is produced in accordance with an instruction issued by a microprocessor 3, and in case it becomes impossible to detect the top dead-center signal $S_1$ because of failure of the sensor system for the top dead-center signal, an instruction is issued from the microprocessor 3 to generate the clock signal $S_4$.

Referring now o FIG. 2, the clock signal $S_3$ or $S_4$ provided from the counter 2 is fed to a counter 4, which in turn counts the number of pulses of the clock signal ($S_3$ or $S_4$) at one period ($t_1$ or $t_2$). The counted data are fed to the microprocessor 3, where the data are utilized for determining the number of revolutions of the internal combustion engine. The reference numeral 5 in FIG. 2 denotes a bus for the transfer of instructions and data.

In the construction described above, while the top dead-center signal $S_1$ is in a state capable of being detected, the number of revolutions of the internal combustion engine is determined by counting the number of pulses of the clock signal $S_3$ at the period $t_1$ of the top dead-center signal $S_1$. On the other hand, when it becomes impossible to detect the top dead-center signal $S_1$, the number of revolutions of the internal combustion engine is determined by counting the number of pulses of the clock signal $S_4$ at the period $t_2$ of the cylinder discrimination signal $S_2$. Since the period $t_4$ of the clock signal $S_4$, which is used when using the cylinder discrimination signal $S_2$, is four times the period $t_3$ of the clock signal $S_3$, the number of pulses counted at the period of the cylinder discrimination signal $S_2$ becomes equal to that counted at the period of the top dead-center signal $S_1$ despite of the period $t_2$ of the cylinder discrimination signal $S_2$ being four times of the period $t_1$ of the top dead-center signal $S_1$. Consequently, the counter 4 does not overflow even when the cylinder discrimination signal $S_2$ having which has a longer period than the period of the top dead-center signal $S_1$ is used to detect the number of revolutions of the internal combustion engine, and it is not necessary for the microprocessor 3 to perform calculation for reducing the counted value to one fourth at every period. Therefore, it is possible to detect the number of revolutions with a high accuracy over high and low revolution regions as in the case of using the top dead-center signal $S_1$. Further, in the case of using the cylinder discrimination signal $S_2$, it has heretofore been necessary that the processing 1 for reducing the counted value to one fourth be done at every period of the cylinder discrimination signal $S_2$. According to the method of the present invention, what is required is only a single issuance of instruction for replacing the clock signal $S_3$ with the clock signal $S_4$ upon confirmation of failure of the sensor system for the top dead-center signal, thus resulting in that the number of steps of an arithmetic processing program for determining the number of revolutions of the internal combustion engine decreases and the entire operation becomes simpler and more rapid.

Although in the above embodiment even the pulse width of the clock signal $S_4$ is set at a value four times that of the clock signal $S_3$, it is not always necessary to do so if only first and second clock signals are provided in corresponding relations respectively to the top dead-center signal and the cylinder discrimination signal so as to provide an equal number of pulses counted at one period of the top dead-center signal and that of the cylinder discrimination signal. Further, the relation between the periods $t_3$ and $t_4$ respectively of the clock signals $S_3$ and $S_4$ is determined according to the relation between the periods $t_1$ and $t_2$ respectively of the top dead-center signal $S_1$ and cylinder discrimination signal $S_2$. Thus, it is not restricted to the relation shown in the above embodiment.

According to the method of the present invention, as will be apparent from the above description, the detection of the number of revolutions of an internal combustion engine using the cylinder discrimination signal can be performed in the same signal processing form as in the case of using the top dead-center signal, so the counter overflowing phenomenon particularly in the low revolution region does not occur and the number of steps of an arithmetic processing program for determining the number of revolutions decreases, thereby permitting an accurate, easy and quick detection of the number of revolutions and an effective compensation for failure of the sensor system for the top dead-center signal in an internal combustion engine.

Further, although in the foregoing embodiment the second clock signal is produced when it becomes impossible to detect the top dead-center signal, it may be produced when the number of revolutions of the internal combustion engine drops below a predetermined value, whereby the counter overflow can be prevented.

What is claimed is:

1. A method of detecting the number of revolutions of an internal combustion engine by using a first signal which is produced when each piston reaches the top dead center and a second signal which is produced when a predetermined cylinder reaches a predetermined time point of its cylinder cycle, and a first clock signal having a period sufficiently smaller than the shortest period of said first signal, said method comprising producing a second clock signal when said first signal is not detected, and the number of revolutions of the internal combustion engine is detected by using said second signal and said second clock signal, said second clock signal having a period such that the ratio of the period of said second clock signal to the period of said first clock signal is the same as the ratio of the period of said second signal to the period of said first signal in rotation of the internal combustion engine, said number of revolutions being obtained by an arithmetic operation which is performed on the basis of said first signal and said first clock signal, and if said first signal is not detected, on the basis of said second signal and said second clock signal, by means of a processing circuit including a central processing unit (CPU), said second clock signal being an output from a terminal which outputs said first clock signal.

2. A detecting method of claim 1 wherein even when said first signal becomes invalid, said number of revolutions is obtained by an arithmetic operation on the second signal and the second clock signal using a program routine which is for obtaining said number of revolutions by an arithmetic operation when said first signal is valid.

* * * * *